(12) United States Patent
Saez

(10) Patent No.: US 12,565,178 B2
(45) Date of Patent: Mar. 3, 2026

(54) SERVO-ASSISTED BRAKING SYSTEM FOR A VEHICLE

(71) Applicant: Independent Driving Systems, Inc., Houston, TX (US)

(72) Inventor: Carlos A. Saez, Houston, TX (US)

( * ) Notice: Subject to any disclaimer, the term of this patent is extended or adjusted under 35 U.S.C. 154(b) by 0 days.

(21) Appl. No.: 18/768,481

(22) Filed: Jul. 10, 2024

(65) Prior Publication Data

US 2025/0018905 A1 Jan. 16, 2025

Related U.S. Application Data

(60) Provisional application No. 63/512,730, filed on Jul. 10, 2023.

(51) Int. Cl.
B60T 7/10 (2006.01)
B60T 7/08 (2006.01)

(52) U.S. Cl.
CPC ................ B60T 7/10 (2013.01); B60T 7/085 (2013.01)

(58) Field of Classification Search
CPC ............. B60T 7/10; B60T 7/085; B60T 7/042
See application file for complete search history.

(56) References Cited

U.S. PATENT DOCUMENTS

| | | | |
|---|---|---|---|
| 656,962 | A | 8/1900 | Gibson |
| 2,471,244 | A | 5/1949 | Lee |

| | | | |
|---|---|---|---|
| 3,117,649 | A | 1/1964 | Parton et al. |
| 4,228,865 | A | 10/1980 | Appley |
| 5,282,522 | A | 2/1994 | Grindle |
| 6,227,629 | B1 * | 5/2001 | Yoshida .................... B60T 7/12 303/155 |
| 6,234,589 | B1 * | 5/2001 | Yoshida ................ B60T 8/4854 303/157 |
| 6,446,992 | B2 | 9/2002 | Sebazco |
| 6,450,587 | B1 | 9/2002 | MacGregor |
| 9,186,990 | B2 | 11/2015 | Ayon |
| 9,896,070 | B2 | 2/2018 | Rosenbaum |
| 2005/0057031 | A1 | 3/2005 | Ahnafield |
| 2005/0057087 | A1 | 3/2005 | Ahnafield |

(Continued)

FOREIGN PATENT DOCUMENTS

| | | | | |
|---|---|---|---|---|
| WO | WO-2018110607 A1 * | 6/2018 | ......... | B60W 30/095 |
| WO | WO-2019012921 A1 * | 1/2019 | ............... | B60T 7/22 |

(Continued)

*Primary Examiner* — Joseph J Dallo
(74) *Attorney, Agent, or Firm* — Egbert, McDaniel & Swartz, PLLC

(57) ABSTRACT

A brake assist system for actuating a brake pedal of a vehicle has an actuator having a cylinder with the rod translatably extending therefrom, a hand control adapted to be positioned adjacent a steering wheel of the vehicle, and a controller connected to the actuator and to the hand control. The actuators adapted to cause the rod to translate relative to the cylinder. One of the rod and the actuator is adapted to be connected to the brake pedal. The hand control is adapted to be grassed by an operator of the vehicle. The hand control is movable from a home position toward an extended position. The controller causes the rod to move relative to the cylinder of the actuator relative to the movement of the hand control. The actuator is a servomotor that causes the rod to rotate so it is translate relative to the cylinder.

20 Claims, 2 Drawing Sheets

(56)     References Cited

U.S. PATENT DOCUMENTS

| | | | |
|---|---|---|---|
| 2005/0274563 A1 | 12/2005 | Ahnafield | |
| 2013/0025273 A1* | 1/2013 | Nozawa | B60T 13/745 |
| | | | 60/545 |
| 2014/0144732 A1* | 5/2014 | Bayer | B60T 7/04 |
| | | | 303/14 |
| 2016/0016569 A1* | 1/2016 | Odaira | B60T 8/4077 |
| | | | 303/15 |
| 2016/0264117 A1* | 9/2016 | Deng | B60T 13/745 |
| 2018/0086323 A1* | 3/2018 | Moore | B60T 8/442 |
| 2018/0162336 A1* | 6/2018 | Ngomssu | B60T 13/662 |
| 2019/0023249 A1* | 1/2019 | Gaffe | B60T 13/66 |
| 2022/0340118 A1* | 10/2022 | Meyer | B60T 13/741 |
| 2022/0396248 A1* | 12/2022 | Patterson | B60T 7/042 |
| 2023/0174027 A1* | 6/2023 | Kondo | B60T 7/042 |
| | | | 74/513 |

FOREIGN PATENT DOCUMENTS

| | | | | |
|---|---|---|---|---|
| WO | WO-2019093018 A1 * | 5/2019 | | B60W 30/18154 |
| WO | WO-2022237179 A1 * | 11/2022 | | B60T 7/06 |

* cited by examiner

SERVO-ASSISTED BRAKING SYSTEM FOR A VEHICLE

CROSS-REFERENCE TO RELATED APPLICATIONS

The present application claims priority of U.S. Provisional Application Ser. No. 63/512,730, filed on Jul. 10, 2023.

BACKGROUND OF THE INVENTION

The present invention relates to vehicle braking systems. More particularly, the present invention relates to braking systems for vehicles that are used by handicapped or disabled persons. More particularly, the present invention relates to braking systems that employ a servomotor for actuating the braking system.

Recently, Federal and State governments have made major strides to allow disabled individuals, such as paraplegics, to pursue occupations of their choice. A paraplegic may suffer paralysis of the lower half of their body involved of the movement of both legs. This prevents their driving of the typical automobile and, thus, hinders their entrance into the workforce. Although the paraplegic may be lacking in strength of their lower half of the body, more than likely, the paraplegic develops superior upper body strength to more than compensate for their disability. It is desirable that vehicles be provided having operator control systems that make use of the paraplegic's upper body strength and do not require the use of their legs.

Furthermore, elderly or disabled persons may have limited use of their legs. This limited use of the leg function can inhibit the ability to properly apply forces to the brake pedal of the vehicle for the stopping of the vehicle. When such injured or elderly persons lack sufficient strength to as to properly actuate the braking system of the vehicle, it is important to provide an assist to the braking system which allows such an individual to properly operate the vehicle safely.

In certain circumstances, the vehicle may be operated by persons other than the disabled, handicapped, injured or elderly person. Under such circumstances, it is not necessary for any sort of brake assist to be utilized. Such alternative persons operate in the vehicle may be unfamiliar with the braking assist system and may improperly use the braking assist system to the detriment of the operation of the vehicle. As such, a need has existed whereby the braking system of the vehicle can be utilized by both the handicapped and disabled individuals and also persons with no disabilities and full functioning legs.

Automobiles that employ control systems that do not require the use of the operator's legs to control the vehicle, such as to perform braking operations, are known. Some of these are described in U.S. Pat. Nos. 656,962, 2,471,244 and 3,117,649. The '962 patent discloses a system having a single device that is used to control the steering, acceleration and braking of the vehicle. This device has a bar handle which has limitations, especially, in the steering aspects of the automobile by present-day drivers who are used to the handling provided by a steering wheel. The '244 patent utilizes a primary steering wheel to accomplish the steering of an automobile and which coacts with the auxiliary steering wheel to assist in the braking operations of the automobile. However, the operators usage of two devices to control one automobile may disadvantageously cause the operator to lose the "feel" of the operating characteristics of the automobile. The '649 patent discloses an automobile that as a single handle to control the principle operations of an automobile which are the steering, acceleration and braking. However, the usage of a single handle to control an automobile has limitations to one who is accustomed to steering an automobile through the use of a steering wheel. It is desired that a control system be provided for an automobile that does not require the use of the legs of the operator to accommodate the braking operation, but does not suffer from prior art limitations.

In addition to the desires of the handicapped individuals, a non-handicapped person may also desire a control system that does not require the use of their legs, especially, if it allows for a system that more readily controls the automobile. This enhanced control system provides continuous control by the driver with their hands always on the steering wheel.

The past various other patents have issued with respect to such braking assist systems for vehicles. For example, U.S. Pat. No. 4,228,865, issued Oct. 21, 1980 and R. J. Appley, describes a vehicle control system for the handicapped. The vehicle utilizes a dual-function hand-operated control system including a lever affixed to a rotatable shaft, a pair of spaced arms extending generally upwardly from the shaft forward of the lever in which one of the arms is pivotally connected to a substantially vertical push rod which extends downwardly into a substantially vertical sleeve. The lower end of the sleeve is operatively connected to a power brake booster through pivotally connecting linkage. The second arm is operatively connected to a throttle cable extending from the dashboard through a flexible connector.

U.S. Pat. No. 5,282,522, issued on Feb. 1, 1994 to G. R. Grindle, teaches a multi-purpose speed control apparatus for an automobile which enables handicapped persons to operate a vehicle with hand-applied power and without foot operation of the pedals. A mounting bracket has a supporting structure which connects with a pair of upstanding tabs, a rotatable shaft serving as a pivot point supported by stubs, and a pivotally-mounted lever connected to the shaft. The lever operates a bell crank mechanism. At one side of the bell crank mechanism connects with a cable which is connected at the opposite end to the accelerator, carburetor or points inbetween to speed up the engine speed. At the opposite end of the equipment, it connects with a flexible drive cable in a sheath wherein the cable and the sheath extend from the installed apparatus under the vehicle and connect with the brake pedal hanger mechanism. This enables a handicapped user to apply the vehicle brakes.

U.S. Pat. No. 6,446,992, issued on Sep. 10, 2002 to R. Sebazco, shows a steering and braking control system for a vehicle. This system includes a steering member that not only allows the operator to accomplish the steering of a vehicle, but also allows the operator to merely exert a force on the steering member to control the braking mechanism of a vehicle. The steering member, acting as a unitary device for controlling two of the principle operations of the vehicle, provides the operator with improved handling capabilities and does so without the operator needing to use their feet. This makes the control system of the vehicle particularly suited for handicapped individuals.

U.S. Pat. No. 6,450,587, issued on Sep. 17, 2002 to McGregor et al., provides a safety-enhancing automatic brake control system that automatically applies and maintains the brakes in an applied state when one or more conditions exist at various stations around or in the vehicle. The controller electrically connects various sensors at the vehicle stations, validates the signals, and then actuates a mechanism that engages the air, brake, fluid, mechanical brake linkage/cable or other mechanism that applies the brakes. In a hydraulic brake system, a piston or spring powers a secondary piston rod and piston and a master cylinder to apply the brakes.

U.S. Pat. No. 9,186,990, issued Nov. 17, 2015 to Ayon et al., provides a system for a manually-controlled operating system for permitting a handicapped person to brake and accelerate an automobile with hand-operated controls. The system comprises a brake handle operably connected to a foot brake pedal with a first cable and an accelerator handle operably connected to a foot accelerator pedal with a second cable. The brake handle and accelerator handler are positioned within hand reach of the handicapped person while positioned within the automobile.

U.S. Pat. No. 9,896,070, issued on Feb. 20, 2018 the R. W. Rosenbaum, shows a brake-by-wire vehicle braking system that is augmented with squeeze sensors placed at the steering wheel of the vehicle so as to enable a vehicle operator to stop the vehicle more quickly in an emergency situation.

U.S. Patent Application Publication No. 2005/0057031, published a Mar. 17, 2005 to B. Ahnafield, teaches a joystick-operated driving system for use by a physically-impaired driver for controlling a vehicle. The system includes an actuator assembly operably coupled to the pedals and an actuator assembly coupled to the steering shaft. The actuator assemblies include electrical motors operable to depress the brake pedal and the accelerator pedal and rotate the steering shaft. A joystick controller is mounted to the vehicle and is operable in a fore-aft direction to control braking and acceleration, and can be tilted side-to-side control vehicle steering.

U.S. Patent Application Publication No. 2005/0057087, published a Mar. 17, 2005 to B. Ahnafield, shows a foot control system for a vehicle for use by physically-impaired driver for controlling a vehicle. This foot control system includes an actuator assembly operably connected to the accelerator and brake pedals of the vehicle. The actuator assemblies include electrical motors operable to depress the brake pedal and the accelerator pedal. A pair of foot controllers are provided that are separate from the existing vehicle pedals. The foot controllers can be manipulated by the driver to generate acceleration and braking commands which are fed to an on-board processor. This processor provides appropriate motor control commands to the processor to produce a vehicle acceleration or braking indicative of the driver's command.

U.S. Patent Application Publication No. 2005/0274563, published on Dec. 15, 2005 to B. Ahnafield, teaches a system for use by physically-impaired driver for controlling a vehicle which includes an actuator assembly operably coupled to the pedals. The actuator assembly includes a pair of electrical motors operably connected to a rack-and-linkage arrangement to depress the brake pedal, and a third electric motor operable through a rack-and-linkage arrangement to depress the accelerator pedal. The actuator assembly is pivotally mounted above the pedals to pivot when the brake pedal is depressed. A joystick controller is mounted to the steering wheel of the vehicle and is operable in a predetermined direction to control braking and acceleration, while allowing vehicle steering to be accomplished with the existing steering wheel.

It is an object of the present invention to provide a servo-assist braking system that reduces the effort required for the braking of a vehicle.

It is another object of the present invention to provide a servo-assist braking system that allows handicapped, injured, elderly, or disabled persons to effectively operate the braking system of the vehicle.

It is another object of the present invention to provide a servo-assisted braking system wherein the travel of the brake and the travel of the handle are proportional to one another.

It is a further object of the present invention to provide a servo-assist braking system which provides feedback to the operator of the vehicle.

It is another object of the present invention to provide a servo-assist braking system which allows non-handicapped individuals to operate the vehicle in a conventional matter manner.

It is still another object of the present invention to provide a servo-assist braking system which can be easily retrofit to existing vehicles.

It is still another object of the present invention to provide a servo-assist braking system which is easy-to-use and relatively inexpensive.

It is still further object of the present invention to provide a servo-assist braking system which complies with state and federal laws regarding vehicle safety.

These and other objects and advantages of the present invention will become apparent from a reading of the attached specification and appended claims.

SUMMARY OF THE INVENTION

The present invention is a brake assist apparatus for actuating a brake pedal of a vehicle. The brake assist apparatus comprises an actuator having a cylinder with a rod translatably extending therefrom, a hand control adapted to be positioned adjacent a steering wheel of the vehicle, and a controller connected to the actuator and to the hand control. The actuator is adapted to cause the rod to translate relative to the cylinder. One end of the rod is adapted to be connected to the brake pedal. The hand control is adapted to be grasped by an operator of the vehicle. The hand control is movable from a home position to an extended position. The controller causes the rod to move relative to the cylinder of the actuator relative to a movement of the hand control from the home position to the extended position.

In the preferred embodiment of the present invention, the actuator is a servomotor. The servomotor causes the rod to rotate so as to translate relative to the cylinder. The rod is adapted to be affixed to the brake pedal. The cylinder is affixed to a surface on the interior of the vehicle. In the preferred embodiment the present invention, the brake pedal has an arm extending rearwardly thereof. The rod is adapted to be pivotally attached to the arm of the brake pedal.

The controller is a potentiometer. The hand control rotationally moves the potentiometer in relation to a movement of the hand control. A bracket is adapted to be affixed to an interior structure of the vehicle. The potentiometer is mounted on or in the bracket. A strut has one end affixed to the bracket and extends outwardly therefrom. The strut has an opposite end connected to the actuator. The strut positions the actuator in a desired position relative to the brake pedal. The potentiometer has a shaft extending therethrough. The hand control is connected to the potentiometer so as to move the potentiometer relative to the shaft. In particular, the hand control has an arm projecting away from the bracket. The arm is operatively connected to the potentiometer.

A resilient member, such as a spring, is cooperative with the arm of the hand control. The resilient member urges the hand control toward the home position. The hand control is depressible so as to overcome the resistance of the resilient member so as to rotate the potentiometer. The resilient member or spring provides tactile feedback to the operator of the vehicle as to the movement of the hand control in relation to the movement of the brake pedal. In particular, the bracket is adapted to be affixed to a steering column of the vehicle. The strut is angularly adjustable relative to the bracket so as to move the actuator to a position adjacent to the brake pedal.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
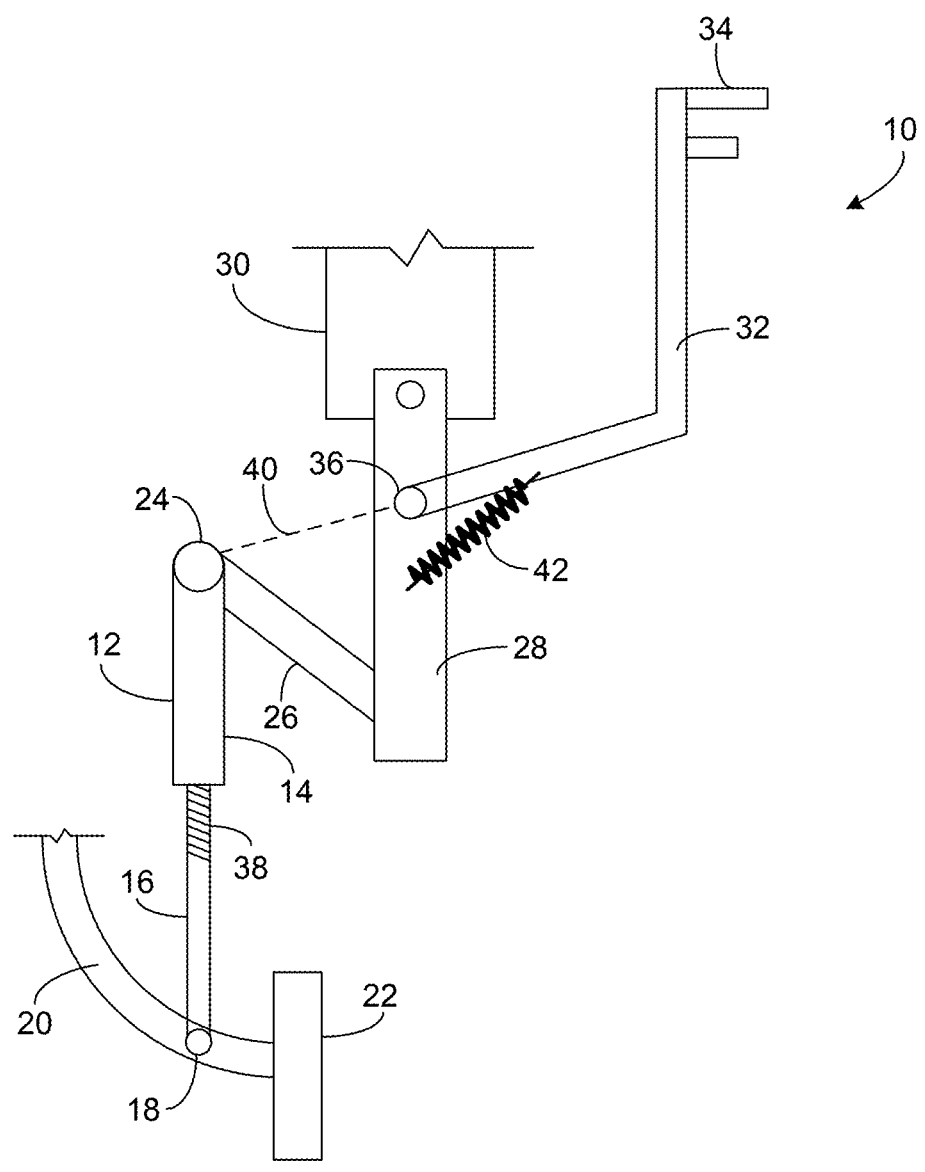
FIG. 1 is a side elevational view showing the brake assist system in accordance with the teachings of the present invention.

Referring to FIG. 1, there is shown the servo-assist braking system 10 of the present invention. This servo-assist braking system 10 includes an actuator 12 having a cylinder 14 with a rod 16 that translatably extends therefrom. The actuator 12 is adapted to cause the rod 16 to translate relative to the cylinder 14. In FIG. 1, it can be seen that an end 18 of the rod 16 is pivotally connected to an arm 20 of the brake pedal 22. The cylinder 14 has an end 24 opposite the rod 16 which is pivotally connected to a strut 26. The strut 26 extends outwardly from a bracket 28. Bracket 28 is illustrated as secured to an interior structure of the vehicle, such as steering column 30. A hand control 32 is adapted to be positioned adjacent to the steering wheel of the vehicle. The hand control 32 is adapted to have a handle 34 grasped by an operator of the vehicle. The hand control 32 is movable from a home position to an extended position. A controller 36 is connected to the actuator 12 and to the hand control 32. The controller 36 causes the rod 16 to move relative to the cylinder 14 in relation to a movement of the hand control 32.

In FIG. 1, it can be seen that the and 18 of the rod 16 is pivotally connected to the arm 20 of the pedal 22. In an alternative embodiment, the end 24 of the cylinder 14 can be pivotally connected the arm 20 of the brake pedal 22. The end 18 of the rod 16 could be pivotally connected to the strut 26. In normal use, the actuator extends in a vertical plane from one end of the strut 26 toward the arm 20 of the brake pedal 22. This configuration allows the rod 16, when actuated by the actuator, 12 to move upwardly or downwardly so as to push the arm 20 inwardly or outwardly for the operation of the brake of the vehicle. This is particularly ideal for when the operator of the vehicle is handicapped, elderly, injured or disabled. However, when a non-handicapped person operates the vehicle, the brake pedal 22 can be operated in a conventional manner. In this way, the actuator 12 will simply pivot about pivot points 24 and 18 so as to allow normal operation of the braking system of the vehicle.

In the preferred embodiment of the present invention, the actuator 12 is a servomotor. This servomotor causes the rod 16 to rotate so as to translate relative to the cylinder 14. The rod 16 will have small threads 38 thereon. The servomotor operates so as to spin the rod 16 so as to draw the rod 16 inwardly or outwardly depending upon a command from the controller 36. Alternatively, the actuator 12 could be a hydraulically-powered cylinder.

In FIG. 3, the controller 36 is a potentiometer. The hand control 32 moves the potentiometer in relation to a movement of the hand control 32. Potentiometer 36 is mounted to bracket 28. In particular, the potentiometer of controller 36 has a shaft extending therethrough. The movement of the hand controller 32 will cause the body of the potentiometer to rotate relative to the shaft in order to change voltage transmitted by the potentiometer. This voltage can be transmitted along line 40 to the servomotor associated with the actuator 12. As such, when a braking of the vehicle is desired, the hand control 32 can be pushed to downwardly so as to rotate the potentiometer of controller 36. This causes a voltage increase to be transmitted along line 42 to the servomotor of actuator 12. This electrical signal causes the servomotor of actuator 12 to rotate the rod 16 and to cause the rod 16 to extend away from the cylinder 14 and to push downwardly on the arm 20 of brake pedal 22 and, thus, brake the vehicle.

In FIG. 1, it can be seen that there is a resilient member 42 extending from bracket 28 to the hand control 32. The resilient member 42 can take on a variety of other embodiments. The broad concept of the resilient member 42 is in the nature of a spring that urges against the downward movement of the hand control 32. When a small force is placed upon the hand control 32 by the operator of the vehicle, this force can overcome the resistance of the resilient member 42 and cause the potentiometer of controller 36 to transmit a signal to the servomotor of the actuator 12. The amount of human energy required so as to move the hand control 32 away from its home position to its extended position can be adapted by changing the resilience of the resilient member 42. For example, if the operator of the vehicle has minimal strength, then a very light spring can be utilized as the resilient member 42. In those cases where the operator vehicle has substantial upper body strength, a stronger spring can be utilized as a resilient member 42. The resilient member 42 can be placed in various locations along the bracket 28 and/or the hand control 32 so as to accomplish this purpose. Additionally, the use of the resilient member 42 provides a tactile feedback to the operator of the vehicle as to the movement of the brake pedal. As such, it will allow the operator to mimic the operation of the brake after a small period of usage. If a large amount of force is required to brake the vehicle (such as in an emergency condition), the operator of the vehicle will know to press down very strongly on the hand control 32. When easier braking is required, such as coming to a stop at a stop light, the operator of the vehicle can apply less force to overcome the resistance of the resilient member 42.

Figure 2:
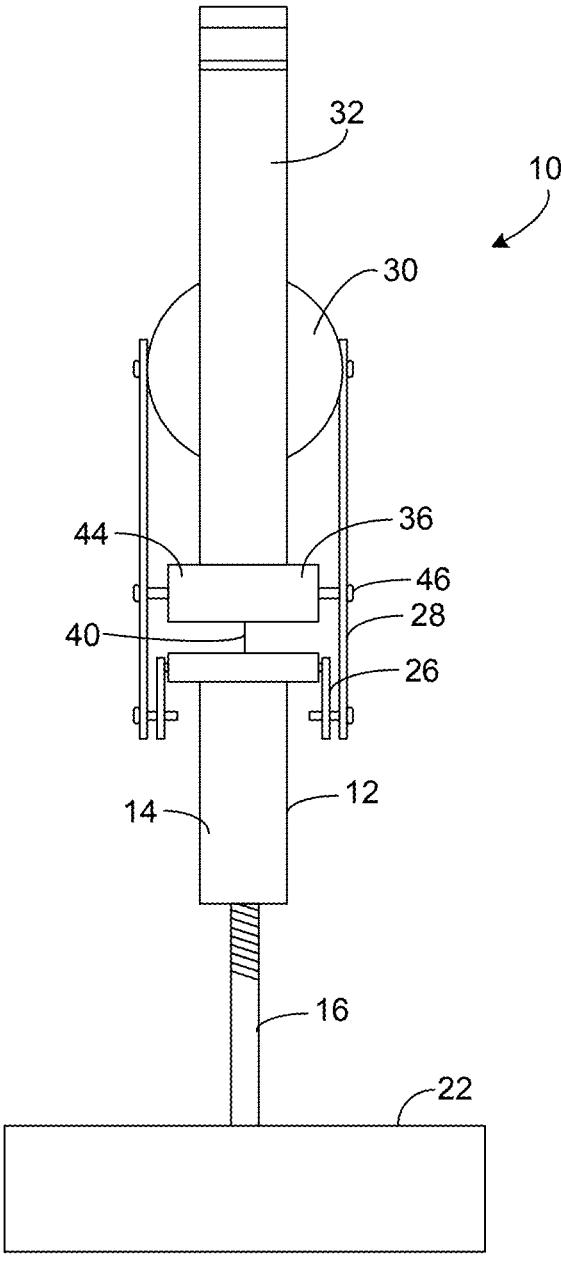
FIG. 2 is a frontal view showing the brake assist system in accordance with the teachings of the present invention.

FIG. 2 is a frontal view showing the servo-assist a braking system 10 of the present invention. FIG. 2 shows the actuator 12 having cylinder 14 with rod 16 extending outwardly therefrom. Rod 16 will be connected to the brake pedal 22 and, in particular, to the arm 20 extending rearwardly of the brake pedal 22 (not shown in FIG. 2). The cylinder 14 is connected and pivotally mounted to the strut 26. Strut 26 is mounted to the interior of the bracket 28. Bracket 28 is secured to opposite sides of steering column 30.

Importantly, in FIG. 2, it can be seen that the controller 36 has a body 44 with a shaft 46 extending therethrough. As such, the movement of the hand control 32 will cause the body 44 to rotate about the shaft 46 so as to cause the potentiometer associated with the controller 36 to transmit a signal along line 40 to the servomotor in cylinder 14 of the actuator 12.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

The invention claimed is:

1. A brake assist apparatus for actuating a brake pedal of a vehicle, the brake assist apparatus comprising:
   an actuator having a cylinder with a rod translatably extending therefrom, said actuator adapted to cause the rod to translate relative to the cylinder, one of the rod and the cylinder adapted to be connected to the brake pedal;
   a hand control adapted to be positioned adjacent a steering wheel of the vehicle, said hand control adapted to be grasped by an operator of the vehicle, said hand control being movable from a home position toward an extended position; and
   a controller connected said actuator and to said hand control, said controller causing the rod to move relative to the cylinder of said actuator and relative to the movement of said hand control.

2. The brake assist apparatus of claim 1, said actuator being a servomotor, the servomotor causing the rod to rotate so as to translate relative to the cylinder.

3. The brake assist apparatus of claim 2, the rod been adapted to be affixed to the brake pedal, the cylinder being affixed to a surface interior of the vehicle.

4. The brake assist apparatus of claim 3, wherein the brake pedal has an arm extending rearwardly thereof, said rod adapted to be pivotally affixed to the arm of said brake pedal.

5. The brake assist apparatus of claim 1, said controller being a potentiometer, said hand control rotationally moving said potentiometer in relation to the movement of said hand control.

6. The brake assist apparatus of claim 5, further comprising:
   a bracket adapted to be affixed to an interior structure of the vehicle, the potentiometer being mounted on or in said bracket.

7. The brake assist apparatus of claim 6, further comprising:
   a strut having one end affixed to said bracket and extending outwardly therefrom, said strut having an opposite end connected to said actuator, said strut positioning said actuator in a desired position relative to the brake pedal.

8. The brake assist apparatus of claim 6, the potentiometer having a shaft extending therethrough, said hand control connected to the potentiometer so as to move the potentiometer relative to the shaft.

9. The brake assist apparatus of claim 6, said hand control having an arm projecting away from said bracket, the arm being operatively connected to the potentiometer.

10. The brake assist apparatus of claim 9, further comprising:

a resilient member cooperative with said arm of said hand control, said resilient member urging said hand control toward the home position.

11. The brake assist apparatus of claim 10, said hand control being depressible so as to overcome the resistance of said resilient member so as to rotate the potentiometer.

12. The brake assist apparatus of claim 6, said bracket adapted to be affixed to a steering column of the vehicle.

13. The brake assist apparatus of claim 7, said strut being angularly adjustable relative to said bracket so as to move said actuator to a position adjacent to the brake pedal.

14. A brake assist system comprising:
   a vehicle having a brake pedal in a passenger compartment thereof, the brake pedal adapted to actuate a brake of the vehicle, said vehicle having a steering column positioned therein;
   an actuator having a cylinder with the rod translatably extending therefrom, said actuator adapted to cause the rod to translate relative to the cylinder, one of the rod and the cylinder adapted to be connected to the brake pedal;
   a hand control positioned adjacent to the steering wheel of the vehicle, said hand control adapted to be grasped by an operator of the vehicle, said hand control being movable from a home position toward an extended position; and
   a controller connected said actuator and to said hand control, said controller causing the rod to move relative to the cylinder of said actuator and relative to a movement of said hand control.

15. The brake assist system of claim 14, said actuator being a servomotor, the servomotor causing the rod to rotate so as to translate relative to the cylinder.

16. The brake assist system of claim 15, wherein the rod is attached to the brake pedal, the cylinder being affixed to the surface interior of the vehicle.

17. The brake assist system of claim 16, wherein the brake pedal has an arm extending rearwardly thereof, said rod pivotally affixed to the arm of said brake pedal.

18. The brake assist system of claim 14, said controller being a potentiometer, said hand control rotationally moving said potentiometer in relation to the movement of said hand control.

19. The brake assist system of claim 18, further comprising:
   a bracket affixed to the steering column of the vehicle, the potentiometer being mounted on or in said bracket; and
   a strut having one end affixed to said bracket and extending outwardly therefrom, said strut having an opposite end connected to said actuator, said strut positioning said actuator in a desired position relative to the brake pedal, the potentiometer having a shaft extending therethrough, said hand control connected to the potentiometer so as to move the potentiometer relative to the shaft.

20. The brake assist system of claim 19, further comprising:
   a resilient member cooperative with said arm of said hand control, said resilient member urging said hand control toward the home position.

\* \* \* \* \*